United States Patent
Smyth

(10) Patent No.: US 7,736,802 B1
(45) Date of Patent: Jun. 15, 2010

(54) ELECTROCHEMICAL CELL CURRENT COLLECTOR COMPRISING SOLID AREA FOR COATED FILM MEASUREMENTS

(75) Inventor: Jennifer Smyth, Amherst, NY (US)

(73) Assignee: Greatbatch Ltd., Clarence, NY (US)

( * ) Notice: Subject to any disclaimer, the term of this patent is extended or adjusted under 35 U.S.C. 154(b) by 1150 days.

(21) Appl. No.: 11/163,782

(22) Filed: Oct. 31, 2005

Related U.S. Application Data

(60) Provisional application No. 60/627,744, filed on Nov. 12, 2004.

(51) Int. Cl.
  *H01M 4/56* (2006.01)
  *H01M 4/74* (2006.01)
  *H01M 4/80* (2006.01)
(52) U.S. Cl. .......... 429/211; 429/122; 429/209
(58) Field of Classification Search .......... 429/244, 429/225, 199, 161, 241, 237, 234, 236, 238, 429/242, 243
See application file for complete search history.

(56) References Cited

U.S. PATENT DOCUMENTS

| | | | |
|---|---|---|---|
| 3,560,742 A | 2/1971 | Weinstock et al. | |
| 4,449,048 A | 5/1984 | Pinches et al. | |
| 4,771,173 A | 9/1988 | Weismuller | |
| 5,196,098 A | 3/1993 | Rodriguez et al. | |
| 5,246,565 A | 9/1993 | Mignardot | |
| 5,954,940 A | 9/1999 | Zdunek et al. | |
| 6,051,038 A * | 4/2000 | Howard et al. | 29/623.1 |
| 6,106,693 A * | 8/2000 | Zdunek et al. | 205/791 |
| 6,224,746 B1 | 5/2001 | Meissner et al. | |
| 6,451,483 B1 * | 9/2002 | Probst et al. | 429/231.7 |
| 6,767,670 B2 | 7/2004 | Paulot et al. | |
| 6,802,917 B1 | 10/2004 | Tomantschger et al. | |
| 2001/0001441 A1 | 5/2001 | Zdunek et al. | |
| 2003/0118909 A1* | 6/2003 | Paulot et al. | 429/245 |
| 2004/0256239 A1 | 12/2004 | Whitlaw et al. | |
| 2005/0058888 A1* | 3/2005 | Aamodt et al. | 429/94 |

* cited by examiner

*Primary Examiner*—Jennifer K Michener
*Assistant Examiner*—Eli S Mekhlin
(74) *Attorney, Agent, or Firm*—Michael F. Scalise

(57) ABSTRACT

A current collector for use in an electrochemical cell comprising a conductive substrate including a frame comprising at least one frame conductor providing a closed perimeter; a mesh grid within the frame; and a first solid area bounded by a perimeter, the perimeter of the first solid area being disposed at least partially within the mesh grid; and a coating disposed on the conductive substrate and having a thickness, the thickness of the coating being measurable by an instrument comprising a mask including an aperture bounded by a perimeter; wherein the mask of the instrument may be placed in contact or nearly in contact with the coating such that the perimeter of the aperture of the mask is located entirely within the perimeter of the first solid area of the conductive substrate.

18 Claims, 5 Drawing Sheets

ELECTROCHEMICAL CELL CURRENT COLLECTOR COMPRISING SOLID AREA FOR COATED FILM MEASUREMENTS

BACKGROUND OF THE INVENTION

1. Field of the Invention

The present invention relates generally to current collectors used in electrochemical cells. More particularly, the present invention relates in one embodiment to a current collector that is integrally provided with a solid area that enables the direct measurement of the thickness of a coating on the current collector.

2. Description of Related Art

Present electrochemical cell designs utilize two primary construction methods. Either the internal electrodes are spirally wound, or they are assembled in a multiple plate configuration. In either case, each of the positive and negative electrodes is comprised of a current collector and active chemical constituents contacted thereto. The current collector can be a conductive foil or screen.

For example, U.S. Pat. No. 5,312,458 to Muffoletto et al., which is assigned to the assignee of the present invention and incorporated herein by reference, describes the construction of one electrochemical cell having a current collector comprising wing-like portions which are folded into electrical association with a central electrode of an opposite polarity.

U.S. Pat. No. 6,893,777 to Probst, which is also assigned to the assignee of the present invention and incorporated herein by reference, describes the construction of another electrochemical cell comprised of a current collector having non-symmetric grid pattern converging at a common focal point.

The current collectors of these electrochemical cells are typically formed from thin screens of a conductive material such as nickel, aluminum, copper, stainless steel, tantalum, cobalt, and titanium, and alloys thereof. Prior to incorporating such a current collector screen into an electrochemical cell, it is known and preferable to coat the screen before contacting the active material thereto. Carbonaceous materials are suitable for this purpose. For example, U.S. Pat. No. 6,451,483 to Probst et al., which is assigned to the assignee of the present invention and incorporated herein by reference, describes a prior art $Li/CF_x$ cell including a titanium cathode current collector screen coated with a thin layer of graphite/carbon paint. In addition to increasing the electrical conductivity between the $Li/CF_x$ active material and the current collector, the graphite/carbon paint serves to prevent direct contact at the interface between the current collector and the active material.

One preferred formulation of such a graphite/carbon paint is described in U.S. Pat. No. 6,767,670 to Paulot et al., which is assigned to the assignee of the present invention and incorporated herein by reference. In this United States patent, at column 3, line 52, it is disclosed that, "The preferred current collector material is titanium, and most preferably the titanium cathode current collector has a thin layer of a carbonaceous material applied thereto. The coating is provided in a range of about of about 0.0001 inches to about 0.0010 inches, and more preferably in a range of about 0.0004 to 0.0005 inches (10 microns to about 12.7 microns)."

It is further disclosed at column 3, line 66 through column 4, line 16, "According to the present invention, a finely divided graphite pigment in an alcohol-based epoxy resin solution is used as the coating material. One of dipping, painting, doctor-blading, pressurized air atomization spraying, aerosolized spraying, or sol-gel deposition is used to contact the carbonaceous material to the current collector substrate. Spraying is a preferred method."

"A particularly preferred material is commercially available from Acheson Industries, Inc., Port Huron, Mich. under the designation ELECTRODAG 213. This material is a colloidal suspension of graphite, propylene glycol, methyl ether acetate, toluene, formaldehyde, xylene, 2-butoxyethanol and proprietary epoxy and thermoset resins. The thusly-coated substrate is then sintered at a temperature of about 230° C. to about 350° C. for about 30 minutes to 1.5 hours. More preferably, the carbonaceous coating is applied to a thickness of about 0.0004 inches and sintered at about 300° C. for at least about one hour."

For this exemplary carbonaceous coating and for other suitable carbonaceous coatings applied to the surface of a current collector, one must ensure that the coating is applied in a sufficient thickness to protect the current collector from corrosion and other deleterious effects, yet not be so thick as to occupy significant internal volume in the cell. Such internal volume is better used for active electrochemical materials, in order to maximize the total capacity and discharge rates of the cell.

There is, therefore, a need in the manufacturing of such current collectors to control the thickness of the carbonaceous coating applied thereto. A prerequisite to such coating thickness control is an accurate measurement of the coating thickness deposited on the surface of the current collector. Such a measurement may be made on a sample of current collectors taken during the manufacturing process, but it is preferable that measurements may be made on each individual current collector screen that is produced. In the latter case, it is obviously required that the measurement method be non-destructive with respect to the coating and the collector screen. It is also preferable that the capability be provided to make coating thickness measurements at multiple locations on a collector screen surface.

One preferred known non-destructive measurement method for measuring the thickness of coatings on substrates is the "Beta Backscatter" method. Beta rays are electrons emitted from unstable radioisotopes. In this method, a highly collimated beta ray source is directed at a coated sample such as a carbonaceous-coated titanium substrate as provided in the present invention. The electrons penetrate the coating material and are reflected back (back scattered) toward the beta ray source. The back-reflected electrons are collected and counted with a Geiger-Mueller tube; the resulting electron count is related to the thickness of the coating, and such thickness is calculated according to known algorithms. For further information on Beta Backscatter techniques for coating thickness measurement, reference may be had to the publication, "Standard Test Method for Measurement of Coating Thickness By the Beta Backscatter Method," Designation: B 567-98 (Reapproved 2003), of ASTM International Inc. of West Conshohocken, Pa. (ASTM International Inc. was formerly known as the American Society for Testing and Materials).

As is disclosed at page 3, paragraph 7.2 of this publication, one requirement for obtaining accurate measurements of coating thickness using the beta backscatter method is that the atomic number of the coating material must be sufficiently different (by at least five atomic numbers) from the atomic number of the substrate material upon which it is coated. Such is clearly the case for the carbonaceous coatings applied to the metallic conductive collector screens of the present invention, used in the aforementioned electrochemical cells.

As is disclosed at page 3, paragraph 7.2.2 of this publication, a second requirement is that, "it is essential that the aperture be smaller than the coated area of the surface on which the measurement is made." In this context, the "aperture" is the aperture of the beta backscatter instrument defined on page 1, paragraph 3.1.2 as "the opening of the mask abutting the test specimen." In other words, within the perimeter of the mask opening is the coated area for which the thickness is measured. This area within the mask opening must be a continuous solid area of coating and substrate, free of any through holes or other gross surface irregularities.

This requirement for aperture size presents a problem in making measurements of prior art current collector screens by the beta backscatter technique. Due to the geometry and size of the mesh patterns of prior art collector screens, there is not provided in these collector screens a large enough section of solid area that is larger than the size of the apertures of typical beta backscatter thickness measurement instruments.

SUMMARY OF THE INVENTION

A current collector is, therefore, needed which includes a sufficient section of solid area so as to enable the measurement of the thickness of a coating deposited thereupon, while still maintaining the overall functionality required of the current collector in its intended use in an electrochemical cell. Accordingly, embodiments of the present invention are provided that meet at least one or more of the following objects of the present invention:

It is an object of this invention to provide a current collector for use in an electrochemical cell, the current collector including a coating that is measurable by the beta backscatter technique.

It is a further object of this invention to provide a current collector for use in an electrochemical cell, the current collector including at least one solid area that is larger than the aperture of an instrument that measures a coating thickness by the beta backscatter technique.

It is a further object of this invention to provide an electrochemical cell including a current collector having at least one solid area wherein a coating deposited thereupon is measurable by the beta backscatter technique.

According to the present invention, therefore, a current collector is provided, which comprises a conductive substrate comprising a frame including at least one frame conductor providing a closed perimeter; a mesh grid within the frame; and a first solid area bounded by a perimeter, the perimeter of the first solid area being disposed at least partially within the mesh grid; and a coating disposed on the conductive substrate and having a thickness, the thickness of the coating being measurable by an instrument comprising a mask including an aperture bounded by a perimeter; wherein the mask of the instrument may be placed in contact or nearly in contact with the coating, such that the perimeter of the aperture of the mask is located entirely within the perimeter of the first solid area of the conductive substrate.

The current collectors of the present invention preferably comprise a plurality of solid areas disposed within or at the perimeter of the mesh grid. The shapes of the solid areas are matched to the shape of the aperture of the instrument used to measure coating thickness, and may be circular, elliptical, square, rectangular, polygonal, triangular, or rhomboidal. The instrument is preferably a beta backscatter instrument. Suitable materials for forming the conductive substrate include nickel, aluminum, copper, stainless steel, tantalum, cobalt, and titanium, and alloys thereof, with titanium being a particularly preferred material. The coating disposed on the conductive substrate is preferably a carbonaceous coating.

The current collectors of the present invention may be formed as simple, substantially rectangular shapes, or in a "double wing" configuration. Alternatively, current collectors of the present invention may be manufactured in planar shapes, but then spirally wound within the electrochemical cell in a "jelly roll" configuration.

Also according to the present invention, an electrochemical cell is further provided which comprises an anode comprising lithium; a cathode comprising $CF_x$ supported on opposed first and second major faces of a conductive current collector, the current collector comprising a conductive substrate including a frame comprised of at least one frame conductor providing a closed perimeter; a mesh grid within the frame; and a first solid area bounded by a perimeter, the perimeter of the first solid area being disposed at least partially within the mesh grid; and a coating disposed on the conductive substrate and having a thickness, the thickness of the coating being measurable by an instrument comprising a mask including an aperture bounded by a perimeter; and an electrolyte activating the anode and the cathode.

Also according to the present invention, a method of quality control for a current collector of an electrochemical cell is further provided comprising the following steps: a) providing a current collector comprising a conductive substrate including a frame having at least one frame conductor providing a closed perimeter; a mesh grid within the frame; and a first solid area bounded by a perimeter, the perimeter of the first solid area being disposed at least partially within the mesh grid; and a coating disposed on the conductive substrate and having a thickness, the thickness of the coating being measurable by an instrument comprising a mask including an aperture bounded by a perimeter; b) providing an instrument for measuring the thickness of the coating of the current collector, the instrument comprising a mask including an aperture bounded by a perimeter; c) positioning the current collector in close proximity to the mask of the instrument such that the perimeter of the aperture of the mask is located entirely within the perimeter of the first solid area of the conductive substrate; and d) making a measurement of the thickness of the coating on the first solid area with the instrument to provide a measured coating thickness of the current collector.

The method may further include the steps of defining a tolerance for the coating thickness having an acceptable lower thickness limit and an acceptable upper thickness limit, and determining if the measured coating thickness of the current collector is within the tolerance. Subsequently, the current collector may be used in building the electrochemical cell if the measured coating thickness of the current collector is within the tolerance. The current collector may comprise a plurality of solid areas for which coating thickness measurements are taken, and such measurements may be statistically analyzed. The instrument for making the coating thickness measurements is preferably a beta backscatter instrument.

The current collector described above is advantageous because it is integrally provided with one or more features that enable the direct measurement of the thickness of a coating thereof, while still retaining full functionality of its intended use in an electrochemical cell. These features add no cost to the current collector, while providing the ability to better control the current collector manufacturing process, thereby enabling the production of higher quality current collectors for electrochemical cells.

The foregoing and additional objects, advantages, and characterizing features of the present invention will become increasingly more apparent upon a reading of the following detailed description together with the included drawings.

BRIEF DESCRIPTION OF THE DRAWINGS

The present invention will be described by reference to the following drawings, in which like numerals refer to like elements, and in which.

Figure 1:
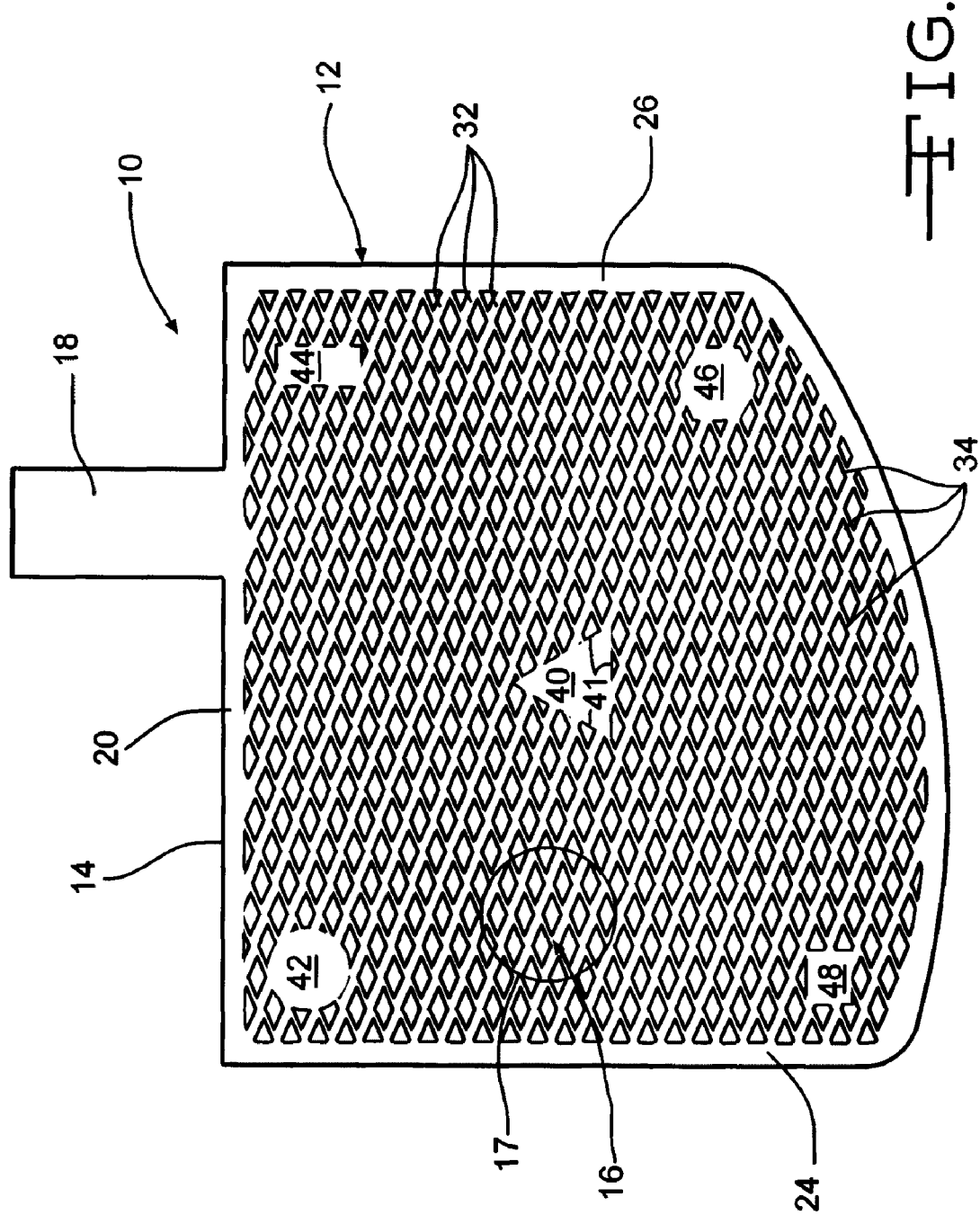
FIG. 1 is a plan view of one embodiment of a current collector of the present invention, including a conductive substrate and a coating on the substrate.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DETAILED DESCRIPTION OF THE PREFERRED EMBODIMENTS

For a general understanding of the present invention, reference is made to the drawings. In the drawings, like reference numerals have been used throughout to designate identical elements. In describing the present invention, a variety of terms are used in the description.

As used herein, the term "solid area" with respect to a current collector is meant to indicate an area of a current collector through which there are no passageways, in contrast to the general mesh grid of the collector through which many passageways or through-holes are provided.

In the present invention, a current collector screen is provided with at least one solid area within the mesh grid, which is larger in area than the size of the aperture of the beta-backscatter instrument to be used in coating thickness measurement. The solid area may also be shaped in a manner that corresponds to the shape of the aperture as well. Accordingly, such solid area may be, e.g., circular, elliptical, square, rectangular, polygonal, triangular, rhomboidal, or irregular, if such a shape is useful in corresponding with the shape of the aperture of the beta backscatter instrument. The current collector may comprise more than one solid area, so that multiple coating thickness measurements may be made on the current collector, and averaged or otherwise analyzed in a statistical manner.

FIG. 1 is a plan view of one embodiment of a current collector of the present invention, including a conductive substrate and a coating on the substrate. Referring to FIG. 1, the current collector 10 generally comprises conductive substrate 12 including wire or bar-shaped conductor strands in the shape of a frame 14 surrounding a mesh grid 16 and supporting a tab 18. The conductors and tab 18 consist essentially of a conductive material such as nickel, aluminum, copper, stainless steel, tantalum, cobalt, and titanium, and alloys thereof. As shown in this Figure, the frame 14 has spaced apart upper and lower strands 20 and 22 extending to and meeting with left and right strands 24 and 26. Tab 18 is a generally solid planar member and extends outwardly from the upper frame strand 20, although other configurations of tab 18 are suitable, such as is shown in FIG. 1 of the aforementioned commonly owned U.S. Pat. No. 6,893,777.

The mesh grid 16, a portion of which is enclosed within the circle designated by numeral 17, is interior of and supported by the frame 14 and comprises a matrix of conductive strands 32 interspersed with mesh openings 34. In the embodiment depicted in FIG. 1, the mesh openings 34 are rhomboidal openings generally aligned in diagonal rows. It will be apparent that numerous other shapes, e.g., circles, squares, hexagons, etc., and other spatial alignments, e.g., rows and columns of mesh openings 34 may be used in the current collectors of the present invention. Additionally, one may provide a current collector 10 having a non-symmetric mesh grid pattern, such as is disclosed in the aforementioned commonly owned U.S. Pat. No. 6,893,777.

Conductive substrate 12 of current collector 10 further comprises at least one solid area, and preferably a plurality of solid areas disposed within the area of the mesh grid 16. Referring again to FIG. 1, conductive substrate 12 is provided with a first solid area 40, for the purpose of making measurements of the thickness of a coating on conductive substrate 12, as will be described subsequently herein. Conductive substrate 12 is preferably provided with additional solid areas distributed at various locations within mesh grid 16, such as solid areas 42, 44, 46, and 48. In the embodiment depicted in FIG. 1, solid areas 42-48 are shown as being circular, rectangular, hexagonal, and square, respectively. This variation in shape is shown for illustrative purposes only, and is not to be construed as limiting. The particular size and shape of a solid area is selected based upon criteria pertaining to the particular beta backscatter or other instrument to be used in obtaining the coating thickness measurement.

Figure 2:
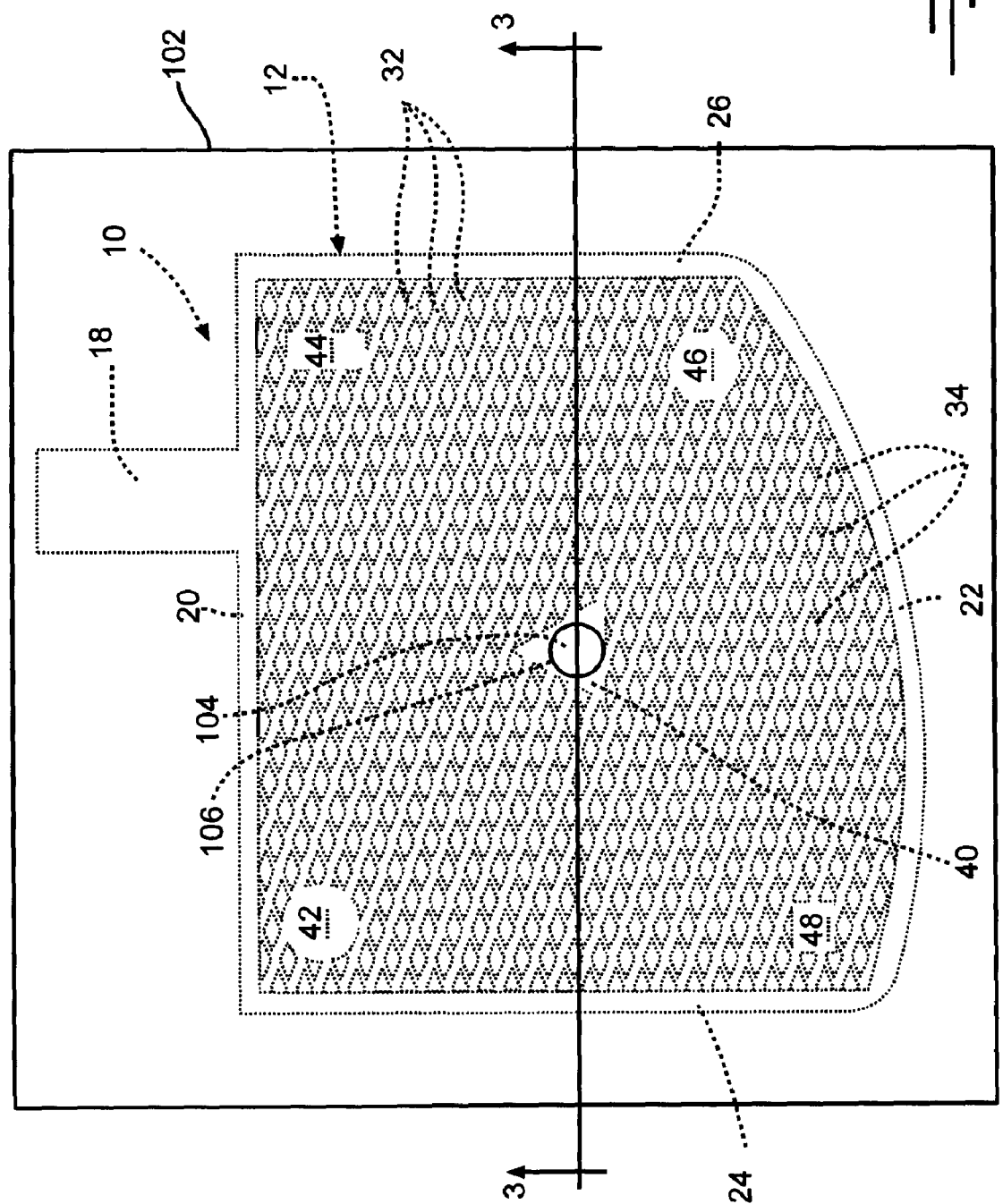
FIG. 2 is a plan view of a mask of a beta backscatter instrument brought into contact with the current collector of FIG. 1 for the purpose of making a measurement of the thickness of a coating of the current collector.
Figure 3:
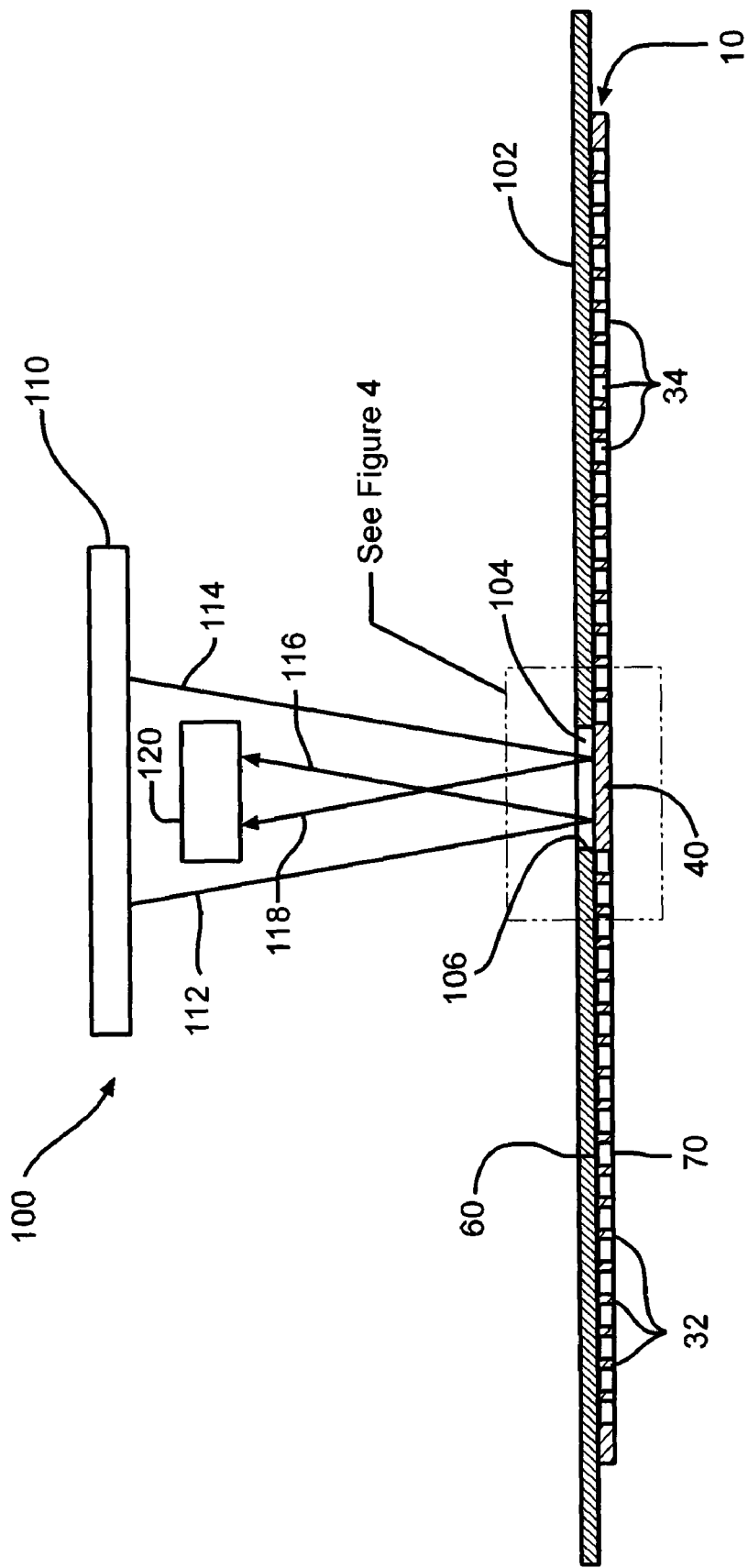
FIG. 3 is a cross-sectional view of the mask and current collector of FIG. 2, as well as additional components of the beta backscatter instrument, taken along the line 3-3 of FIG. 2.

The use of a beta backscatter instrument to make coating thickness measurements on the current collectors of the present invention, and the advantages of the configurations of the current collectors of the present invention in easily enabling such measurements will now be explained. FIG. 2 is a plan view of a mask 102 of a beta backscatter instrument brought into contact with the current collector 10 of FIG. 1 for the purpose of making a measurement of the thickness of a coating of the current collector. FIG. 3 is a cross-sectional view of the mask 102 and current collector 10 of FIG. 2, as well as additional components of the beta backscatter instrument, taken along the line 3-3 of FIG. 2.

Referring first to FIG. 3, there is depicted a schematic representation of a beta backscatter instrument 100 comprising a beta ray source 110 containing a radioactive isotope, a mask 102, and a Geiger-Müeller tube 120, which detects backscattered radiation. In operation, beta radiation including beta rays 112 and 114 are emitted from source 110. Some portion of the beta radiation including rays 112 and 114 pass through an aperture 104 in mask 102, impinging upon the surface surrounded by aperture 104; and of this radiation passing through aperture 104, some lesser portion including rays 116 and 118 is scattered back toward the Geiger-Müeller tube 120. Backscattered rays 116 and 118 are detected by Geiger-Mueller tube 120.

Referring also to FIG. 2, mask 102, which is substantially planar and parallel to the upper surface of current collector 10, is positioned in close proximity, i.e. in contact with, or nearly in contact with the coating on one surface of current collector 10 such that the perimeter 106 of the aperture 104 of mask 102 is located entirely within the triangular perimeter 41 (see also FIG. 1) of solid area 40, which is disposed within mesh grid 16. It will be apparent that the shape of solid area 40 may be other than triangular in shape, with the functional requirement for making satisfactory coating thickness measurements being that the perimeter 106, regardless of its shape, be located entirely within the perimeter 41 of solid area 40, regardless of its shape. It will be further apparent that the perimeter 41 of the solid area 40 may be matched in shape to the perimeter 106 of mask 104 in order to minimize the overall size of solid area 40 needed to enable a satisfactory coating thickness measurement to be made.

Figure 4:
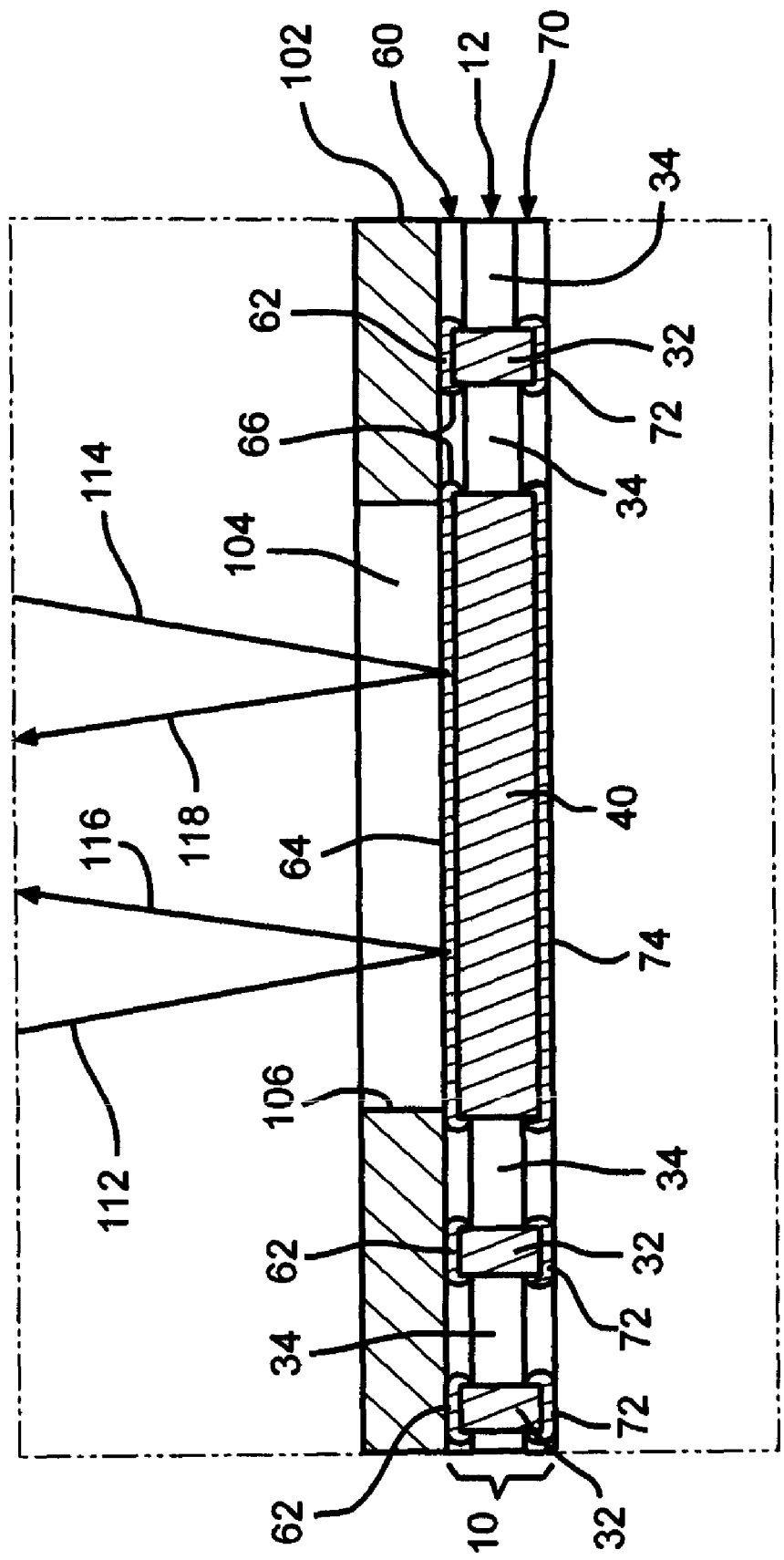
FIG. 4 is a detailed view of the cross-section of the current collector enclosed within the dashed box of FIG. 3 that is marked "See FIG. 4.

It is not required that the mask 102 of the instrument 100 be in contact with the coated surface of the current collector to be measured. The instrument 100 may be a contactless beta backscatter instrument, such as is disclosed in U.S. Pat. No. 4,771,173 to Weismuller, the disclosure of which is incorporated herein by reference. When such an instrument is used, the mask of the instrument may be near the coated surface, but not in contact with the coated surface. Thus in this context, "close proximity" is to be considered as sufficiently close to the coated surface so as to provide a high enough signal-to-noise ratio for the Geiger-Müeller tube to detect the backscattered beta rays from the coated surface that is bounded by the perimeter of the aperture 104 of the mask. As is disclosed at column 6, lines 28-68 of the Weismuller patent, in one embodiment, the "working distance" between the mask of the instrument and the coated surface to be measured is preferably less than 5 millimeters, and in one example, the working distance is 2.4 millimeters. FIG. 4 is a detailed view of the cross-section of the current collector enclosed within the dashed box of FIG. 3 that is marked "See FIG. 4." Referring in particular to FIG. 3 and FIG. 4, current collector 10 is depicted with a coating 60 disposed on a top surface of conductive substrate 12 and a coating 70 disposed upon a bottom surface of conductive substrate 12. Coatings 60 and 70 provide protection of the top and bottom surfaces of conductive substrate 12. In particular, coated areas 64 and 74 protect solid area 40, and conductive strands 32 that are interspersed with mesh openings 34 are protected by coated areas 62 and 72. Coatings 60 and 70 also protect the surfaces of frame 14, tab 18, and solid areas 42-48 (see FIG. 1).

In one preferred embodiment, coatings 60 and 70 are a carbonaceous material consisting essentially of a finely divided graphite pigment in an epoxy resin. An alcohol-based dispersion of this solid material is used as the liquid coating material from which coatings 60 and 70 are cast. One of dipping, painting, doctor-blading, pressurized air atomization spraying, aerosolized spraying, or sol-gel deposition is used to contact the carbonaceous material to the current collector substrate 12. Spraying is a preferred method.

In the embodiment depicted in FIG. 4, the applicant believes that when spray coating is used as a coating method, the coatings may terminate with some degree of radiused taper 66 at edges of the mesh openings 34 in conductive substrate 12. It will be apparent that with certain other coating processes, such as dip coating, coatings 60 and 70 would extend fully into mesh openings 34 and join continuously with each other. Hence the coating configuration depicted in FIG. 4 is merely to be considered as illustrative, and in no way limits the current collectors of the present invention.

Referring again to FIG. 3 and FIG. 4, it is noted that only two beta rays 112 and 114 are depicted as emanating from source 110, and that such beta rays are simply reflected from the surface of coating 64. It is to be understood that much more beta radiation is emanating from source 110 at various angles, that such radiation penetrates into the bulk of coating 64, and that a portion of such beta radiation is scattered back to Geiger-Müeller tube 120 at various angles where it is detected and used to determine the thickness of coating 64 according to known algorithms.

It is to be further understood that the depiction of the reflection of beta radiation as shown in FIGS. 3 and 4 is done only for the sake of simplicity of illustration, and is not meant to be indicative of how the phenomenon of beta backscattering occurs. For a further description of beta backscatter techniques for coating thickness measurement, reference may be had to the aforementioned publication, "Standard Test Method for Measurement of Coating Thickness By the Beta Backscatter Method," Designation: B 567-98 of ASTM International Inc. Reference may also be had to the aforementioned U.S. Pat. No. 4,771,173 to Wiesmuller, which describes a contactless apparatus and method for thickness determination of coatings using the beta backscatter technique.

Referring again to FIG. 2 and FIG. 3, in order to obtain multiple coating thickness measurements, current collector 10 is provided with a plurality of solid areas such as e.g., solid areas 42-48. In operation, the beta backscatter instrument 100 may be translatable in the plane of mask 102 (also defined by line 3-3 of FIG. 2); or current collector 10 may be mounted on a corresponding two-axis stage (not shown), so that the aperture 104 of mask 102 may be positioned sequentially directly over each of solid areas 42-48, thereby obtaining a measurement of the coating thickness at each solid area, so that multiple coating thickness measurements are made on the current collector 10. These measurements may be averaged and/or otherwise analyzed in a statistical manner, such as e.g. calculating standard deviation, 95 percent confidence interval, and/or six-sigma limits. In like manner, current collector 10 may be inverted, and the portions of coating 70 on the bottom surface of conductive substrate 12 that are disposed on solid areas 40-48 (such as coating 74 on solid area 40) may be measured.

In a preferred current collector and electrochemical cell manufacturing operation, tolerance limits are defined for acceptable lower and upper values of coating thickness. If the measured coating thickness(es) of a current collector is determined to be within the tolerance, such current collector is determined to be acceptable, and is subsequently built into and used in an electrochemical cell. If the coating thickness is not acceptable, the current collector is determined to be reject material, and is sent to scrap or a recycling operation.

Current collector 10 of FIGS. 1 and 2 is depicted with solid areas 42, 44, 46, and 48 being fully enclosed within the mesh grid 16. It will be apparent that solid areas 42-48 could be disposed further outwardly toward the perimeter of conductive substrate 12 such that they are contiguous with portions of strands 20, 22, 24, and 26 of frame 14, thereby providing the requisite solid area needed for thickness measurement. In general, more or fewer than five solid areas may be provided in the current collectors of the present invention, and such solid areas may be located in the corners, around the edges, in the middle, or any combination thereof within the conductive substrate 12.

Referring again to FIG. 2 and FIG. 3, a typical aperture 104 of a beta backscatter instrument 100 is circular in shape. So, regardless of the shape of the solid area 40, its perimeter must be entirely external to the perimeter 106 of aperture 104. In one embodiment, solid area 40 is provided as an equilateral triangle. This is equally applicable to the other solid areas 42, 44, 46 and 48 having shapes other than triangular.

Figure 5:
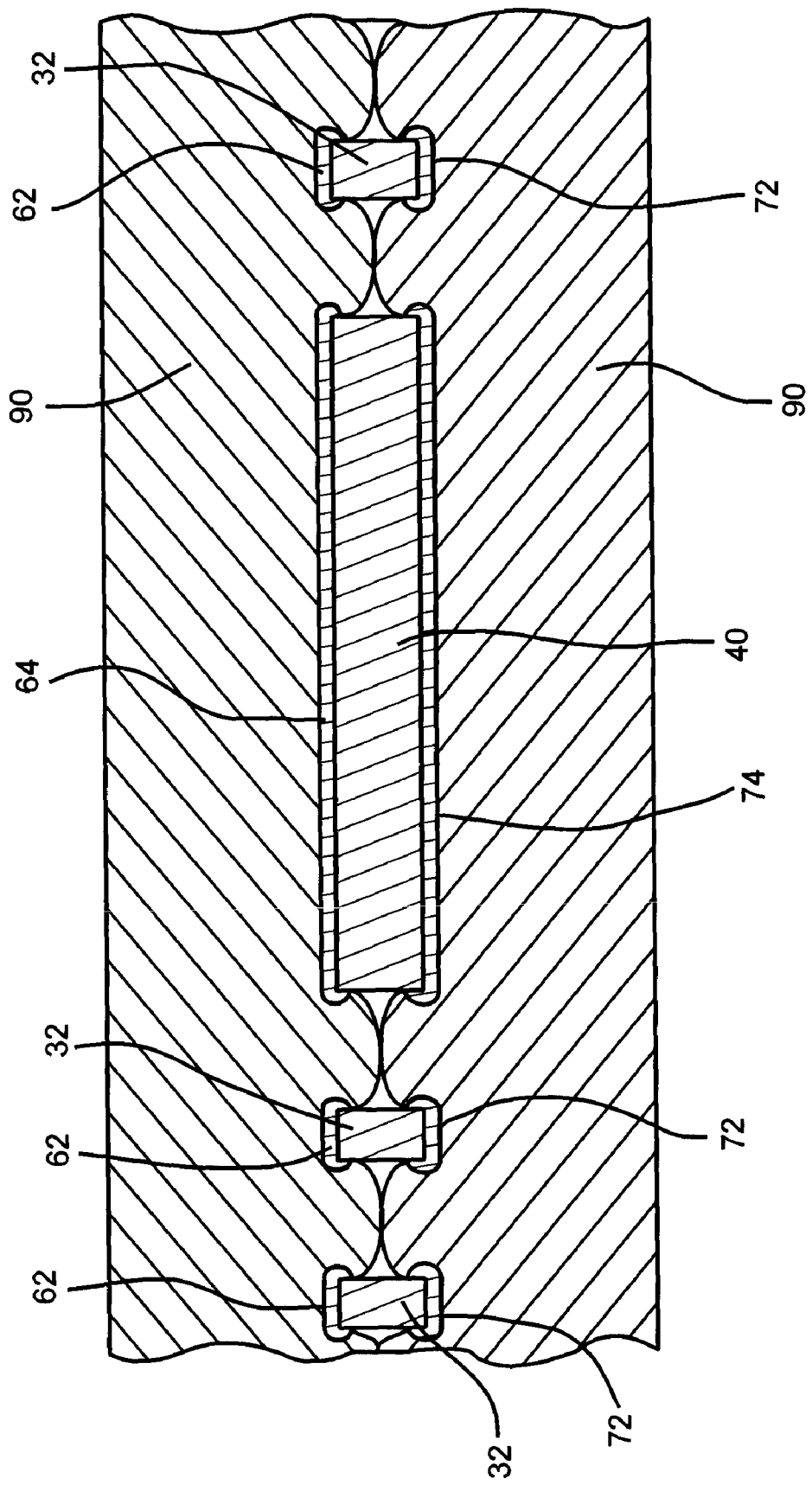
" and FIG. 5 is a cross-sectional view of the same portion of the current collector as depicted in FIG. 4, shown as part of an electrochemical cell, and in contact with an active material of such cell.

FIG. 5 is a cross-sectional view of the same portion of the current collector 10 as depicted in FIG. 4, shown as part of an electrochemical cell and in contact with an active material of such cell. The portions of current collector 100 comprising solid area 40 and conductive strands 32 of conductive substrate 12, and coated areas 64, 74, 62, and 72 disposed thereupon are shown embedded within active material 90 of an electrochemical cell. In one preferred embodiment, conductive substrate 12 is formed from a titanium sheet having a thickness of between about 0.0005 and about 0.005 inches, conductive coatings 60 and 70 are formed from the carbonaceous coating ELECTRODAG 213 of Acheson Industries, Inc., Port Huron, MI at a thickness of between about 0.0004 and 0.0005 inches, and the active material 90 is fluorinated carbon, $CF_x$. The electrochemical cell is preferably a lithium/$CF_x$ cell. Examples of suitable fluorinated carbon materials of lithium/$CF_x$ cells are described in the aforementioned commonly owned U.S. Pat. No. 6,451,483 to Probst et al. incorporated herein by reference. The current collector is also useful in a primary lithium/silver vanadium oxide cell or a Li/$MnO_2$ cell as well as with secondary chemistries having a carbonaceous anode coupled with a litheated cathode, such as $LiCoO_2$.

In the foregoing description, embodiments of the present invention have been described wherein the current collector 10 comprises a single planar sheet of material that is contained within an electrochemical cell. It is to be understood that this description is not to be construed as limiting, and that the current collector 10 may be formed in a variety of other overall geometric shapes, and then reformed into non-planar shapes within an electrochemical cell. For example, such a current collector may be formed in a "double wing" configuration as shown in FIG. 2 and described at column 4 lines 31-36 of the aforementioned U.S. Pat. No. 6,893,777 incorporated herein by reference. Alternatively, current collectors of the present invention may be manufactured in a planar shape, but then spirally wound within the electrochemical cell in the known "jelly roll" configuration. Such a cell and current collector are described in U.S. Pat. No. 6,569,558 to Takeuchi et al., which is assigned to the assignee of the present invention and incorporated herein by reference.

In addition, embodiments of the present invention have been described in which the preferred measurement technique is beta backscattering. It is to be understood that the current collectors of the present invention are not to be construed as being limited by the particular measurement technique used, and that the provision of one or more solid areas therein are useful in enabling the use of any measurement technique requiring such a solid area for coating thickness measurement.

It is, therefore, apparent that there has been provided in accordance with the present invention, a current collector for an electrochemical cell, the current collector being integrally provided with a solid area that enables the direct measurement of the thickness of a coating on the current collector. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A current collector, which comprises:
    a conductive substrate comprising:
        i) a frame including at least one frame conductor providing a closed perimeter;
        ii) a mesh grid within the frame; and
        iii) a first solid area bounded by a perimeter, the perimeter of the first solid area being disposed at least partially within the mesh grid; and
    b) a coating disposed on the conductive substrate and having a thickness, wherein the thickness of the coating on the first solid area is measurable by an instrument comprising a mask including an aperture bounded by a perimeter and the mask can be located within the perimeter of the first solid area.

2. The current collector as recited in claim 1, wherein the conductive substrate further comprises a second solid area bounded by a perimeter, the perimeter of the second solid area being disposed at least partially within the mesh grid.

3. The current collector of claim 2 wherein there are at least a first and a second solid areas, each being completely disposed within the mesh grid.

4. The current collector as recited in claim 1, wherein the shape of the first solid area is selected from the group consisting of circular, elliptical square, rectangular, polygonal, triangular, and rhomboidal.

5. The current collector as recited in claim 1, wherein the conductive substrate consists essentially of a material selected from the group consisting of nickel, aluminum, copper, stainless steel, tantalum, cobalt, and titanium, and alloys thereof.

6. The current collector as recited in claim 1, wherein the conductive substrate consists essentially of titanium.

7. The current collector as recited in claim 1, wherein the coating is a carbonaceous coating.

8. The current collector as recited in claim 7, wherein the thickness of the coating is between about 0.0001 inches to about 0.0010 inches.

9. The current collector of claim 1
    wherein the perimeter of the first solid area is completely disposed within the mesh grid.

10. An electrochemical cell, which comprises:
    a) an anode comprising lithium;
    b) a cathode comprising CF), supported on opposed first and second major faces of a conductive current collector, the current collector comprising:
        i) a conductive substrate including a frame comprising at least one frame conductor providing a closed perimeter; a mesh grid within the frame; and a first solid area bounded by a perimeter, the perimeter of the first solid area being disposed at least partially within the mesh grid; and
        ii) a coating disposed on the conductive substrate and having a thickness, wherein the thickness of the coating on the first solid area is measurable by an instrument comprising a mask including an aperture bounded by a perimeter and the mask can be located within the perimeter of the first solid area; and
    c) an electrolyte activating the anode and the cathode.

11. The electrochemical cell of claim 10 wherein the perimeter of the first solid area is completely disposed within the mesh grid.

12. The electrochemical cell of claim 10 wherein there are at least a first and a second solid areas, each bounded by a perimeter that is disposed at least partially within the mesh grid.

13. The electrochemical cell of claim 12 wherein the at least first and second solid areas are completely disposed within the mesh grid.

14. The electrochemical cell of claim 10 wherein the shape of the first solid area is selected from the group consisting of circular, elliptical square, rectangular, polygonal, triangular, and rhomboidal.

15. The electrochemical cell of claim 10 wherein the conductive substrate consists essentially of a material selected from the group consisting of nickel, aluminum, copper, stainless steel, tantalum, cobalt, and titanium, and alloys thereof.

16. The electrochemical cell of claim 10 wherein the conductive substrate consists essentially of titanium.

17. The electrochemical cell of claim 10 wherein the coating is a carbonaceous coating.

18. The electrochemical cell of claim 17 wherein the thickness of the coating is between about 0.0001 inches to about 0.0010 inches.

* * * * *